United States Patent
Peri et al.

(10) Patent No.: US 7,997,072 B2
(45) Date of Patent: Aug. 16, 2011

(54) STAMPED PILOT WELDED TO A COVER

(75) Inventors: Patanjali Peri, Wadsworth, OH (US);
Steven Olsen, Wooster, OH (US);
Patrick Lindemann, Wooster, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 612 days.

(21) Appl. No.: 12/151,657

(22) Filed: May 8, 2008

(65) Prior Publication Data

US 2008/0277226 A1 Nov. 13, 2008

Related U.S. Application Data

(60) Provisional application No. 60/966,305, filed on Aug. 27, 2007, provisional application No. 60/928,437, filed on May 9, 2007.

(51) Int. Cl.
*F16H 45/02* (2006.01)
*F16H 41/00* (2006.01)
(52) U.S. Cl. ........................................ 60/330
(58) Field of Classification Search ............. 60/330
See application file for complete search history.

(56) References Cited

U.S. PATENT DOCUMENTS

| | | | | |
|---|---|---|---|---|
| 2,745,354 | A * | 5/1956 | English et al. | 60/367 |
| 4,274,519 | A * | 6/1981 | Moroto et al. | 192/3.28 |
| 4,470,535 | A * | 9/1984 | Motomura et al. | 228/125 |
| 4,502,279 | A | 3/1985 | Fuehrer | |
| 4,768,633 | A * | 9/1988 | Kubo et al. | 192/3.29 |
| 6,036,439 | A | 3/2000 | Mizobuchi et al. | |
| 6,651,330 | B2 * | 11/2003 | Yamanaka et al. | 29/889.5 |
| 6,662,446 | B2 * | 12/2003 | Yamanaka et al. | 29/889.5 |
| 7,083,029 | B2 | 8/2006 | Seebacher et al. | |
| 2004/0250594 | A1 * | 12/2004 | Schwenk | 72/348 |
| 2006/0016661 | A1 | 1/2006 | George et al. | |

* cited by examiner

*Primary Examiner* — Thomas E Lazo
(74) *Attorney, Agent, or Firm* — Simpson & Simpson, PLLC

(57) ABSTRACT

A torque converter including a cover having a central longitudinal axis and an outer surface and a pilot stamped from metal. The pilot includes a disc at least partially radially aligned with the axis for the cover. The pilot and the cover central axis are fixedly secured to each other. In a first embodiment, the disc is flat. In a second embodiment, the disc is annular. In a third embodiment, the pilot includes a machined outer circumferential surface. In a fourth embodiment, the pilot includes first and second portions radially off-set with respect to one another. In a fifth embodiment, the pilot includes a portion axially extending from the portion of the disc at least partially radially aligned with the axis for the cover. In a preferred embodiment, the cover and pilot are fixedly secured by welding.

14 Claims, 5 Drawing Sheets

US 7,997,072 B2

STAMPED PILOT WELDED TO A COVER

CROSS-REFERENCE TO RELATED APPLICATIONS

This application claims the benefit under 35 U.S.C. §119 (e) of U.S. Provisional Application No. 60/966,305 filed Aug. 27, 2007 and U.S. Provisional Application No. 60/928,437 filed on May 9, 2007, which applications are incorporated herein by reference.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a torque converter with a stamped pilot that is welded to a torque converter cover.

BACKGROUND OF THE INVENTION

FIG. 1 is a cross-sectional view of a prior art torque converter, shown secured to an engine of a motor vehicle. Generally, the three main components of the torque converter are the pump 37, turbine 38, and stator 39. The torque converter becomes a sealed chamber when the pump is welded to cover 11. Cover 11 includes pilot 54 extending axially from the cover. Pilot 54 is concentric with cover 11 and connected to the cover by weld 56. Pilot 54 is used to align the cover lugs or studs with the engine crankshaft or flexplate during installation of the torque converter.

Cover 11 is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

The pilot functions to align the torque converter assembly with the flexplate so that the torque converter assembly may be rotationally attached to the engine. By align, we mean that the pilot is manufactured to specific tolerances in order to fit within a recess in the crankshaft such that the torque converter lugs or studs properly align with the flexplate. Once the lugs or studs are attached to the flexplate, the pilot does not carry much load.

Traditionally, torque converter pilots were either welded then machined or formed integral to the cover in a stamping process. The first procedure, welding then machining, required forging a pilot, machining the pilot to specific dimensions, welding the pilot to the cover, and again machining the pilot to compensate for the distortion caused by the welding process. Although this process provides the ease of reduced stamping operations, the multiple machining operations and forging of the pilot are both costly and time consuming.

The second procedure, stamping the pilot, required an increase in the process steps for production of the cover. To produce a torque converter cover, a piece of sheet metal is stamped by presses in multiple stations until the proper form is realized. However, stamping the cover pilot requires additional stations in the press, additional press cycles, or potentially retooling with more complex dies or longer stroke presses. By this we mean that the stamping process may need to have a large number of dies to form the pilot or special presses due to the additional axial length needed to stamp the pilot.

Therefore, there is a long-felt need to provide a torque converter cover with a pilot which is easy to manufacture and cost efficient, yet is still able to properly align the torque converter with the flexplate during installation.

BRIEF SUMMARY OF THE INVENTION

The present invention broadly comprises a torque converter including a cover having a central longitudinal axis and an outer surface and a pilot stamped from metal. The pilot includes a disc at least partially radially aligned with the axis for the cover. The pilot and the cover central axis are fixedly secured to each other. In a first embodiment, the disc is flat. In a second embodiment, the disc is annular. In a third embodiment, the pilot includes a machined outer circumferential surface. In a fourth embodiment, the pilot includes first and second portions radially off-set with respect to one another.

In a fifth embodiment, the pilot includes a portion axially extending from the portion of the disc at least partially radially aligned with the axis for the cover. In a preferred embodiment, the cover and pilot are fixedly secured by welding. The welding is selected from the group consisting of mig welding, tig welding, projection welding, spot welding, laser welding, friction welding, and electron beam welding. In a sixth embodiment, the pilot includes a segment at an acute angle with respect to the axis for the cover. In a seventh, the cover includes a protrusion axially extending from the outer surface. In an eighth embodiment, the protrusion is stamped and is a centering apparatus.

In a ninth embodiment, the cover includes a mounting feature axially extending from the protrusion. In one embodiment, the mounting feature is located about a radially central portion of the protrusion and the mounting feature is a centering device. In a tenth embodiment, the axially extending portion includes a curved surface and a portion of the pilot is formed to configure to the curved surface.

The present invention also broadly comprises methods of forming a torque converter cover assembly These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
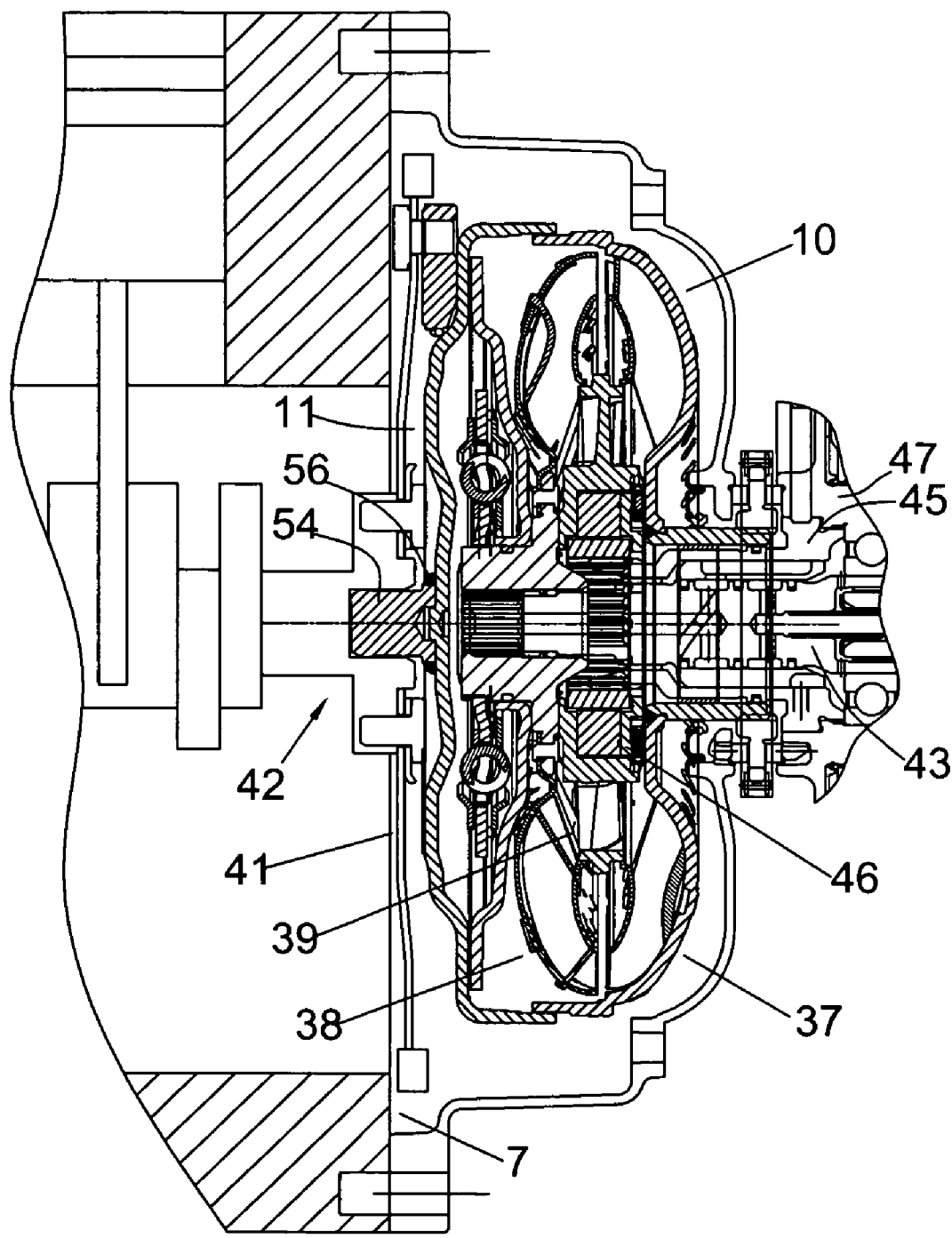
FIG. 1 is a cross-sectional view of a prior art torque converter, shown secured to an engine of a motor vehicle.
Figure 2A:
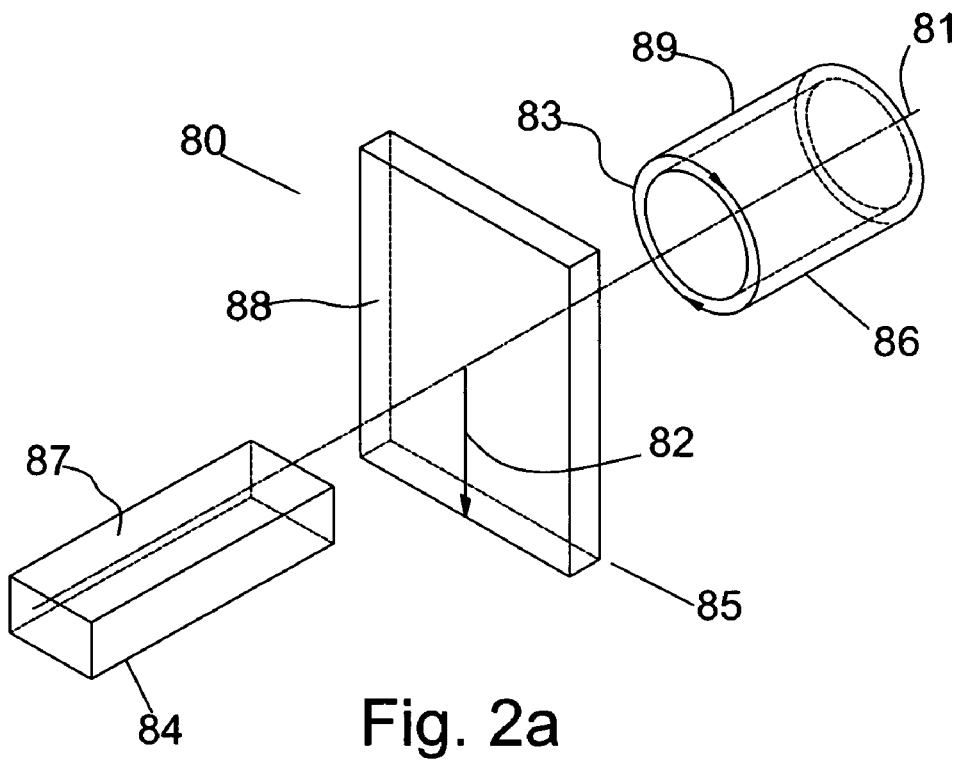
FIG. 2A is a perspective view of a cylindrical coordinate system demonstrating spatial terminology used in the present application.

FIG. 2A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 2B:
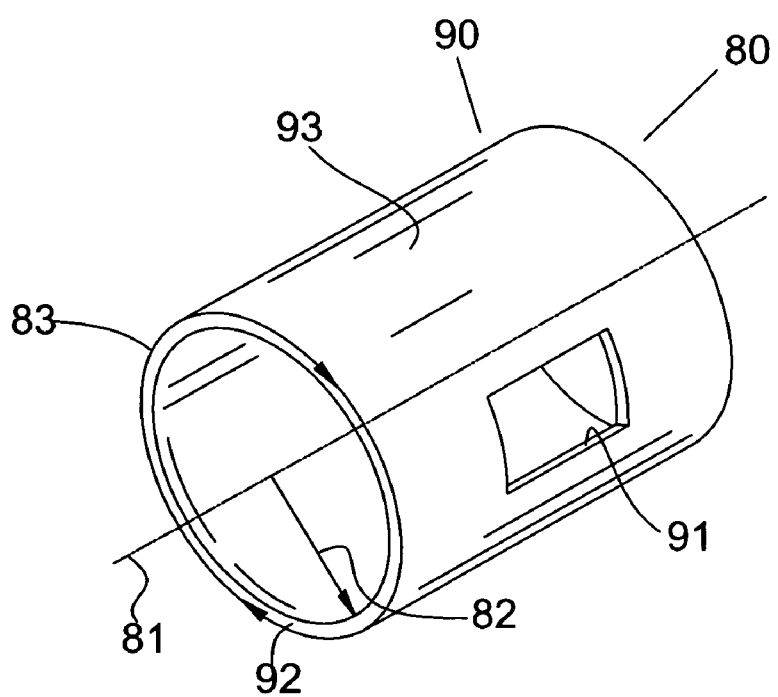
FIG. 2B is a perspective view of an object in the cylindrical coordinate system of FIG. 2A demonstrating spatial terminology used in the present application.

FIG. 2B is a perspective view of object 90 in cylindrical coordinate system 80 of FIG. 2A demonstrating spatial terminology used in the present application. Cylindrical object 90 is representative of a cylindrical object in a cylindrical coordinate system and is not intended to limit the present invention is any manner. Object 90 includes axial surface 91, radial surface 92, and circumferential surface 93. Surface 91 is part of an axial plane, surface 92 is part of a radial plane, and surface 93 is part of a circumferential plane.

Figures 3, 4:
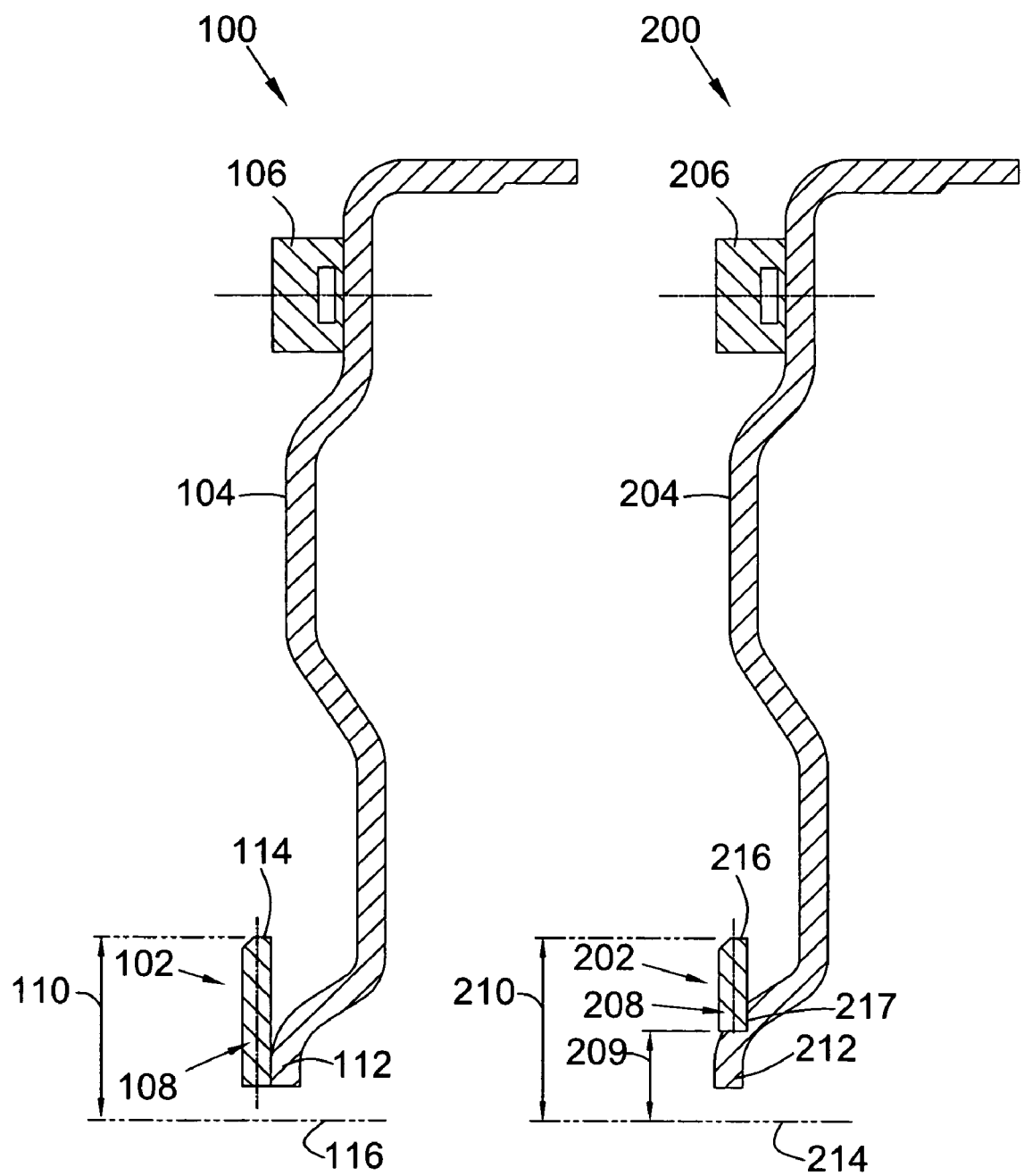
FIG. 3 is a cross-sectional view of a present invention torque converter cover with a disc for a pilot.
FIG. 4 is a cross-sectional view of a present invention torque converter cover with a washer for a pilot.

FIG. 3 is a cross-sectional view of present invention torque converter cover 100 with disc 102 for the pilot. Pilot 102 is fixedly secured to outer surface 104 of torque converter cover 100. By outer surface, we mean the side of the torque converter cover that is not sealed after assembly, or in other words, the side of the torque converter cover that is located proximate the engine when assembled in the vehicle. Also located on outer surface 104 are mounting fixtures 106, one of which is shown. Mounting fixture 106 carries virtually all of the engine torque and is used to secure the torque converter to the flexplate.

In a preferred embodiment, pilot 102 is a thin, metal disc which is easily stamped and is generally circular in shape. By thin, we mean the cross-sectional thickness of pilot 102 is small and may be similar in thickness to the thickness of toque converter cover 100. In some aspects, torque converter cover 100 includes protrusion 112 extending axially outward about central axis 116 of the cover, the torque converter, and the pilot. By extending axially outward, we mean protrusion 112 extends toward the engine side. By central axis of the cover, we mean the radially central axis of the cover. Pilot 102 includes central radial axis 108. Advantageously, radius 110 of pilot 102 is relatively small, which means that in some aspects, pilot 102 can be stamped from unused or scrap material leftover from previously stamped components. In the alternative, pilot 102 can be concurrently stamped with other components, thereby reducing the number of stamping operations necessary.

In some aspects, pilot 102 is fixedly secured to torque converter cover 100 by welding. Pilot 102 can be welded to torque converter cover 100 by any welding means known in the art, including, but not limited to, mig (metal inert gas) welding, tig (tungsten inert gas) welding, projection welding, spot welding, laser welding, friction welding, or electron beam welding. Advantageously, if projection welding is used, the additional projections needed can easily be included during the stamping process of either torque converter cover 100 or pilot 102.

In some aspects, pilot 102 includes outside circumferential surface 114 which is machined to exact dimensions after pilot 102 is welded to torque converter cover 100. As can be seen, the use of a thin metal pilot which is easily stamped and welded to torque converter cover 100 provides the same locating function as a forged pilot at a lower cost.

FIG. 4 is a cross-sectional view of present invention torque converter cover 200 with washer 202 for the pilot. Pilot 202 is fixedly secured to outer surface 204 of torque converter cover 200. By outer surface, we mean the side of the torque converter cover that is not sealed after assembly, or in other words, the side of the torque converter cover that is located proximate the engine when assembled in the vehicle. Also located on outer surface 204 are mounting fixtures 206, one of which is shown. Mounting fixture 206 carries virtually all of the engine torque and is used to secure the torque converter to the flexplate.

In a preferred embodiment, pilot 202 is a thin, metal washer which is easily stamped and is generally circular in shape. By thin, we mean the cross-sectional thickness of pilot 202 is small and may be similar in thickness to the thickness for torque converter cover 204. In some aspects, torque converter cover 200 includes protrusion 212 extending axially outward about central axis 214 of the cover, the torque converter, and the pilot. By extending axially outward, we mean protrusion 212 extends toward the engine side. Pilot 202 includes inner radius 209 and outer radius 210. In some aspects, protrusion 212 includes step 217 which is arranged to centrally locate pilot 202 and reduce the axial length of the torque converter cover. Advantageously, radius 210 is relatively small, which means that in some aspects pilot 202 can be stamped from unused or scrap material leftover from previously stamped components. In the alternative, pilot 202 can be concurrently stamped with other components, thereby reducing the number of stamping operations necessary.

In some aspects, pilot 202 is fixedly secured to torque converter cover 200 by welding. Pilot 202 can be welded to torque converter cover 200 at inner radius 209 of pilot 202 by mig welding, tig welding, projection welding, spot welding, laser welding, friction welding, or electron beam welding.

In some aspects, outside circumferential surface 216 is machined to exact dimensions after pilot 202 is welded to torque converter cover 200. The use of a washer, or annular ring, as pilot 202 advantageously reduces the axial length of torque converter cover 200, thereby reducing the axial length of the assembled torque converter.

Figures 5, 6:
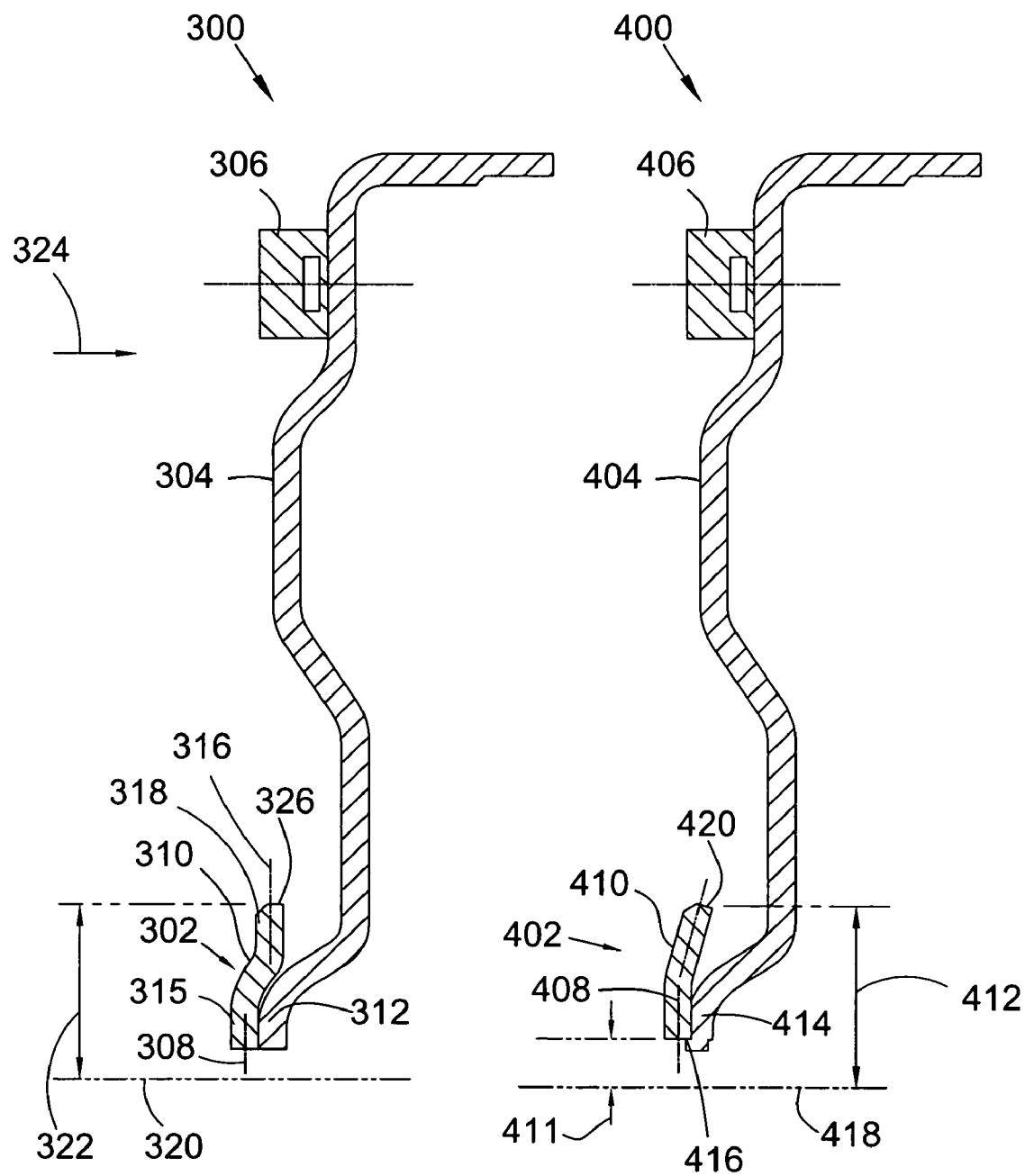
FIG. 5 is a cross-sectional view of a present invention torque converter cover with a disc having two radially off-set portions for a pilot.
FIG. 6 is a cross-sectional view of a present invention torque converter cover with a disc having an angular profile for a pilot; and, FIG. 7 is a cross-sectional view of a present invention torque converter cover with a disc having two perpendicular portions for a pilot.

FIG. 5 is a cross-sectional view of present invention torque converter cover 300 with a disc having two radially off-set portions for a pilot. Pilot 302 is fixedly secured to outer surface 304 of torque converter cover 300. By outer surface, we mean the side of the torque converter cover that is not sealed after assembly, or in other words, the side of the torque converter cover that is located proximate the engine when assembled in the vehicle. Also located on outer surface 304 are mounting fixtures 306, one of which is shown. Mounting fixture 306 carries virtually all of the engine torque and is used to secure the torque converter to the flexplate.

In a preferred embodiment, pilot 302 is a thin, metal disc which is easily stamped and is generally circular in shape. By thin, we mean the cross-sectional thickness of pilot 302 is small and may be similar in thickness to the thickness of torque converter cover 300. In some aspects, pilot 302 includes a pair of parallel radial axes 308 and 316. That is, the pilot includes radially off-set segments 315 and 318 connected by step 310. Step 310 is used to facilitate the use of a disc shaped pilot while maintaining the advantages of an annular ring or washer shaped pilot.

In some aspects, torque converter cover 300 includes protrusion 312 extending axially outward about central axis 320 of the cover, the torque converter, and the pilot. By extending axially outward, we mean protrusion 312 extends toward the engine side. Advantageously, radius 322 of pilot 302 is relatively small, so that pilot 302 can be stamped from unused or scrap material leftover from previously stamped components. In the alternative, pilot 302 can be concurrently stamped with other components, thereby reducing the number of stamping operations necessary. Pilot 302 is concentrically located proximate central axis 320 of torque converter cover 300.

In some aspects, pilot 302 is fixedly secured to torque converter cover 300 by welding. Pilot 302 can be welded to torque converter cover 300 by mig welding, tig welding, projection welding, spot welding, laser welding, friction welding, or electron beam welding. Advantageously, if projection welding is used, the additional projections needed can easily be included during the stamping process of either torque converter cover 300 or pilot 302.

Advantageously, pilot 302 provides the additional strength of a solid pilot, while reducing the axial space at the outside radius of the pilot. For example, outer circumferential portion 318 is axially displaced in direction 324 and reduces the axial length of the cover at the outer circumferential surface 326. In addition, outer circumferential surface 326 can be machined to exact dimensions after pilot 302 is welded to torque converter cover 300.

FIG. 6 is a cross-sectional view of present invention torque converter cover 400 with disc 402 having an angular profile for the pilot. Pilot 402 may include inner radius 411 and outer radius 412. However, it should be apparent to one of ordinary skill in the art that pilot 402 can be a disk instead of a washer. Pilot 402 is fixedly secured to outer surface 404 of torque converter cover 400. By outer surface, we mean the side of the torque converter cover that is not sealed after assembly, or in other words, the side of the torque converter cover that is located proximate the engine when assembled in the vehicle. Also located on outer surface 404 are mounting fixtures 406, one of which is shown. Mounting fixture 406 carries virtually all of the engine torque and is used to secure the torque converter to the flexplate.

In a preferred embodiment, pilot 402 is a thin, metal washer which is easily stamped and is generally circular in shape. By thin, we mean the cross-sectional thickness of pilot 402 is small and may be similar in thickness to torque converter cover 400. Advantageously, small radius 412 of pilot 402 means that pilot 402 can be stamped from unused or scrap material leftover from previously stamped components. In the alternative, pilot 402 can be concurrently stamped with other components, thereby reducing the number of stamping operations necessary. Pilot 402 is concentrically located proximate central axis 418 of torque converter cover 400.

In some aspects, pilot 402 is fixedly secured to torque converter cover 400 by welding. Pilot 402 can be welded to torque converter cover 400 by mig welding, tig welding, projection welding, spot welding, laser welding, friction welding, or electron beam welding. Advantageously, if projection welding is used, the additional projections needed can easily be included during the stamping process of either torque converter cover 400 or pilot 402.

In some aspects, torque converter cover 400 includes protrusion 414 extending axially outward about central axis 418 of the cover, the torque converter, and the pilot. By extending axially outward, we mean protrusion 414 extends toward the engine side. Additionally, mounting feature 416 may be included at the radially central point of torque converter cover 400. Mounting feature 416 allows pilot 402 to be stamped with inner radius 411 approximately equal to the outer radius of mounting feature 416 to ensure a tight fit and perfectly centered alignment of pilot 402. In addition, mounting feature 416 provides material which can be melted and joined to pilot 402 during the welding process as opposed to using outer surface 404 of torque converter cover 400.

In further aspects, pilot 402 includes radial axis 408 and ramp 410 which creates an angular profile for pilot 402. Ramp 410 directs pilot 402 back towards torque converter cover 400 and terminates at outer radius 412. For example, the ramp is at an acute angle with respect to axis 418. Surface 420 is machined to exact dimensions after pilot 402 is welded to torque converter cover 400. Ramp 410 is used to allow the use of a disc shaped pilot for increased strength while maintaining the advantages of a washer shaped pilot. Namely, pilot 402 provides the additional strength of a solid pilot, while reducing the axial space at the outside radius of the pilot.

Figure 7:
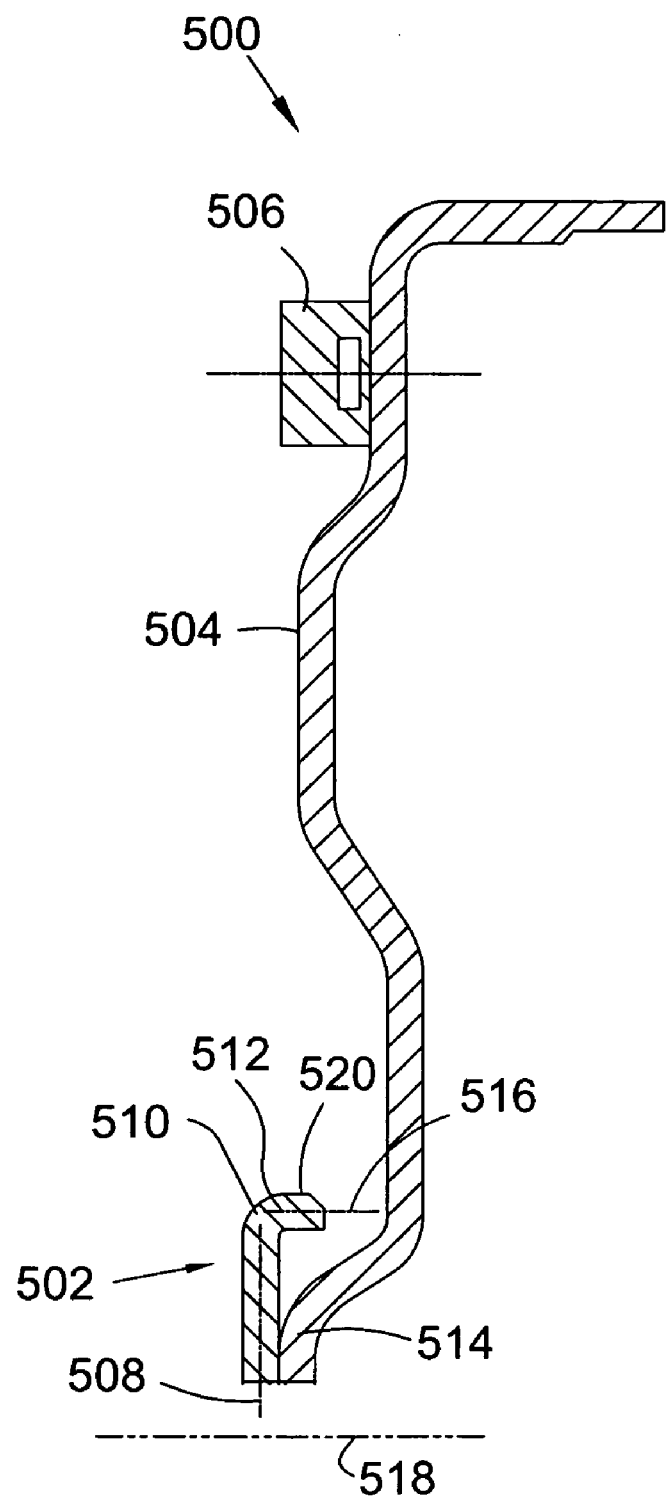

FIG. 7 is a cross-sectional view of present invention torque converter cover 500 with disc 502 having two perpendicular portions for the pilot. Pilot 502 is fixedly secured to outer surface 504 of torque converter cover 500. By outer surface, we mean the side of the torque converter cover that is not sealed after assembly, or in other words, the side of the torque converter cover that is located proximate the engine when assembled in the vehicle. In some aspects, torque converter cover 500 includes protrusion 514 extending axially outward about central axis 518 of the cover, the torque converter, and the pilot. By extending axially outward, we mean protrusion 514 extends toward the engine side. Also located on outer surface 504 are mounting fixtures 506, one of which is shown. Mounting fixture 506 carries virtually all of the engine torque and is used to secure the torque converter to the flexplate.

In a preferred embodiment, pilot 502 is a thin, metal disc which is easily stamped and is generally circular in shape. By thin, we mean the cross-sectional thickness of pilot 502 is small and may be similar in thickness to torque converter cover 500. Advantageously, the small radius of pilot 502 means that pilot 502 can be stamped from unused or scrap material leftover from previously stamped components. In the alternative, pilot 502 can be concurrently stamped with other components, thereby reducing the number of stamping operations necessary. Pilot 502 is concentrically located proximate central axis 518 of torque converter cover 500.

In some aspects, pilot 502 is fixedly secured to torque converter cover 500 by welding. Pilot 502 can be welded to torque converter cover 500 by mig welding, tig welding, projection welding, spot welding, laser welding, friction welding, or electron beam welding. Advantageously, if projection welding is used, the additional projections needed can easily be included during the stamping process of either torque converter cover 500 or pilot 502.

In further aspects, pilot 502 includes central radial axis 508 perpendicular to axis 518 and axis 516 parallel to axis 518. Pilot 502 also includes perpendicular segment 512, parallel to axis 516, and formed by radius 510. During the stamping operation of pilot 502, perpendicular segment 512 is formed by stamping radius 510 at approximately 90°. Advantageously, perpendicular segment 512 includes outer circumferential 520 of pilot 502 in this arrangement and provides a larger machining surface for the final pilot machining process and alignment surface for mounting the assembled torque converter. In addition, pilot 502 incorporates a larger outer circumferential surface 520 and reduced axial length of the torque converter cover due to the stamped pilot.

The present invention further includes a method of forming a torque converter cover assembly. Torque converter cover assembly 100 is used for illustrative purposes and as such the described method is applicable to any torque converter cover assembly. Although the method is described as a sequence of steps for clarity, no order should be inferred unless explicitly stated. A first step in forming a torque converter cover is stamping pilot 102. Another step is stamping torque converter cover 100. Yet another step is welding mounting fixture 106 to torque converter cover 100. Another step is welding stamped pilot 102 to concentric outer surface 104 of torque converter cover 100. The final step is machining outer circumferential surface 114 of pilot 102.

The present invention further includes a method of assembling a torque converter. Torque converter cover assembly 100 is used for illustrative purposes; however the described method is applicable to any torque converter assembly. Although the method is described as a sequence of steps for clarity, no order should be inferred unless explicitly stated. One step is welding stamped pilot 102 to stamped torque converter cover 100. Another step is machining outer circumferential surface 114 of pilot 102. Yet another step is installing a turbine and a stator within torque converter cover 100. Still another step is locating a pump over the turbine and the stator. The final step is sealing torque converter cover 100 and the pump.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A torque converter comprising:
   a cover having a central longitudinal axis and an outer surface; and,
   a pilot stamped from metal, the pilot including a longitudinal axis co-linear with the axis for the cover and a disc at least partially radially aligned with the axis for the cover, wherein said pilot and said cover are fixedly secured to each other and wherein the cover further comprises a protrusion axially extending from said outer surface.

2. The torque converter of claim 1 wherein the disc is flat.

3. The torque converter of claim 1 wherein the disc is annular.

4. The torque converter of claim 1 wherein said pilot further comprises a machined outer circumferential surface.

5. The torque converter of claim 1 wherein said pilot further comprises first and second portions radially off-set with respect to one another.

6. The torque converter of claim 1 wherein said pilot further comprises a portion axially extending from the portion of the disc at least partially radially aligned with the axis for the cover.

7. The torque converter of claim 1 wherein said cover and said pilot are fixedly secured by welding.

8. The torque converter of claim 7 wherein said welding is selected from the group consisting of mig welding, tig welding, projection welding, spot welding, laser welding, friction welding, and electron beam welding.

9. The torque converter of claim 1 wherein said pilot further comprises a segment at an acute angle with respect to the axis for the cover.

10. The torque converter of claim 1 wherein said protrusion is stamped and is a centering apparatus.

11. The torque converter of claim 1 wherein the cover includes a mounting feature axially extending from said protrusion.

12. The torque converter of claim 11 wherein said mounting feature is located about a radially central portion of said protrusion and said mounting feature is a centering device.

13. The torque converter of claim 1 wherein said axially extending portion further comprises a curved surface and a portion of said pilot is formed to configure to said curved surface.

14. A torque converter comprising:
   a cover having a central longitudinal axis and an outer surface; and,
   a pilot stamped from metal, the pilot including a longitudinal axis co-linear with the axis for the cover and a disc at least partially radially aligned with the axis for the cover, wherein:
   said pilot and said cover are fixedly secured to each other;
   the disc is flat; and,
   a radially outward portion of the disc is inclined toward the cover.

* * * * *